United States Patent [19]

Barter

[11] 4,442,458
[45] Apr. 10, 1984

[54] CRT VIDEO DRIVE CIRCUIT WITH BEAM CURRENT STABILIZATION

[75] Inventor: Archie M. Barter, Beaverton, Oreg.

[73] Assignee: Tektronix, Inc., Beaverton, Oreg.

[21] Appl. No.: 363,342

[22] Filed: Mar. 29, 1982

[51] Int. Cl.³ .......................... H04N 5/68; H04N 5/18
[52] U.S. Cl. ...................................... 358/243; 358/172
[58] Field of Search .................. 358/34, 65, 172, 184, 358/242, 243, 74

[56] References Cited

U.S. PATENT DOCUMENTS

| 3,598,913 | 8/1971 | Janssen ................................. 358/172 |
| 4,200,882 | 4/1980 | Janssen . |
| 4,224,640 | 9/1980 | Hovens et al. ......................... 358/74 |

FOREIGN PATENT DOCUMENTS 54-38719 3/1979 Japan .................................. 358/242

OTHER PUBLICATIONS

Conrac 6000 Series Monitor, Video Amplifier Board Schematic, Nov. 12, 1976.

*Primary Examiner*—John C. Martin
*Assistant Examiner*—John K. Peng
*Attorney, Agent, or Firm*—John D. Winkelman

[57] ABSTRACT

The drive circuit of the present invention is characterized by a second amplifier for amplifying the video signal which controls the voltage at the control grid $G_1$ of the cathode-ray tube. This second amplifier has a wider bandwidth than the similar amplifiers of the prior art. It therefore generates a signal having a lower dynamic range than the dynamic ranges of the output signals associated with the similar amplifiers of the prior art. To compensate for the lower dynamic range of the output signal generated by the second amplifier, the drive circuit of the present invention measures the current in the cathode of the cathode-ray tube, converts this measured current into a voltage, stores the voltage in a capacitance, and amplifies the stored voltage in a fourth amplifier. The fourth amplifier generates a signal having a wider dynamic range than the dynamic range of second amplifier. The output of the fourth amplifier is combined with the output of the second amplifier. Consequently, the DC signal from the fourth amplifier is added to the AC signal from the second amplifier. The dynamic range of the signal from the fourth amplifier is therefore added to the dynamic range of the output signal from the second amplifier. The resultant signal energizes the grid $G_1$ of the cathode-ray tube. The video amplifier of the present invention therefore has a wider bandwidth than prior art video amplifiers while retaining a relatively wide dynamic range of the signal energizing the control grid $G_1$.

3 Claims, 2 Drawing Figures

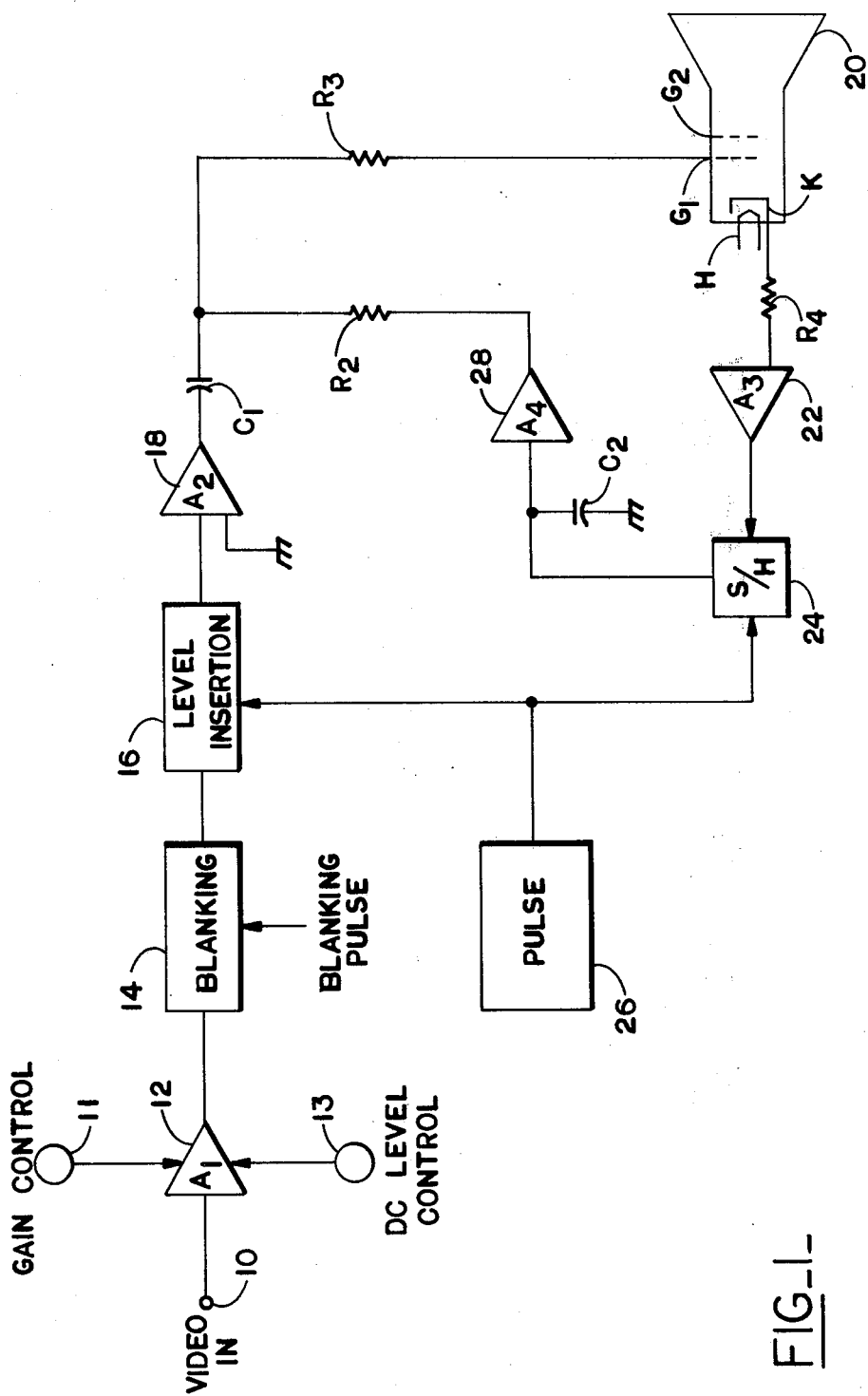
FIG_1_

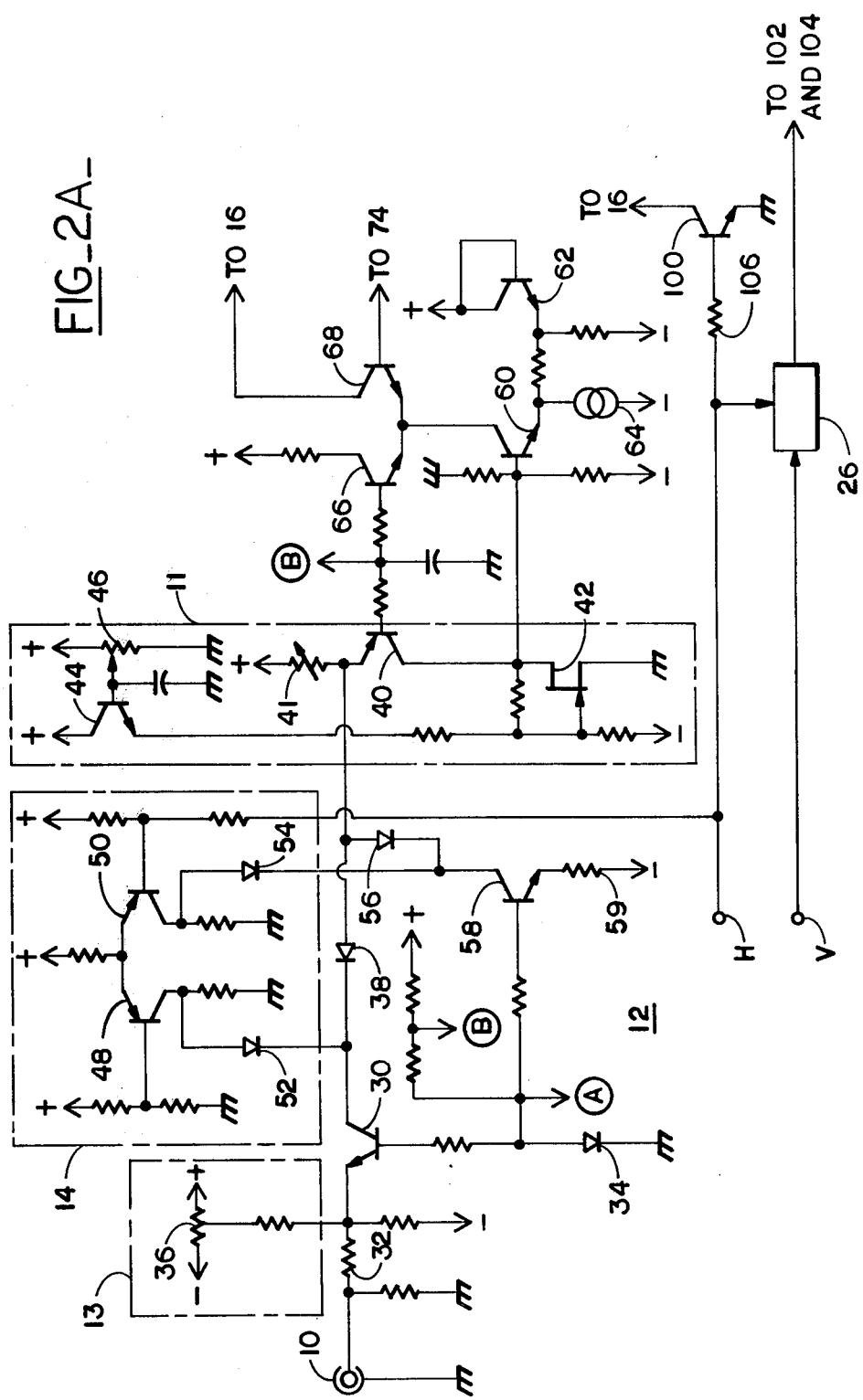

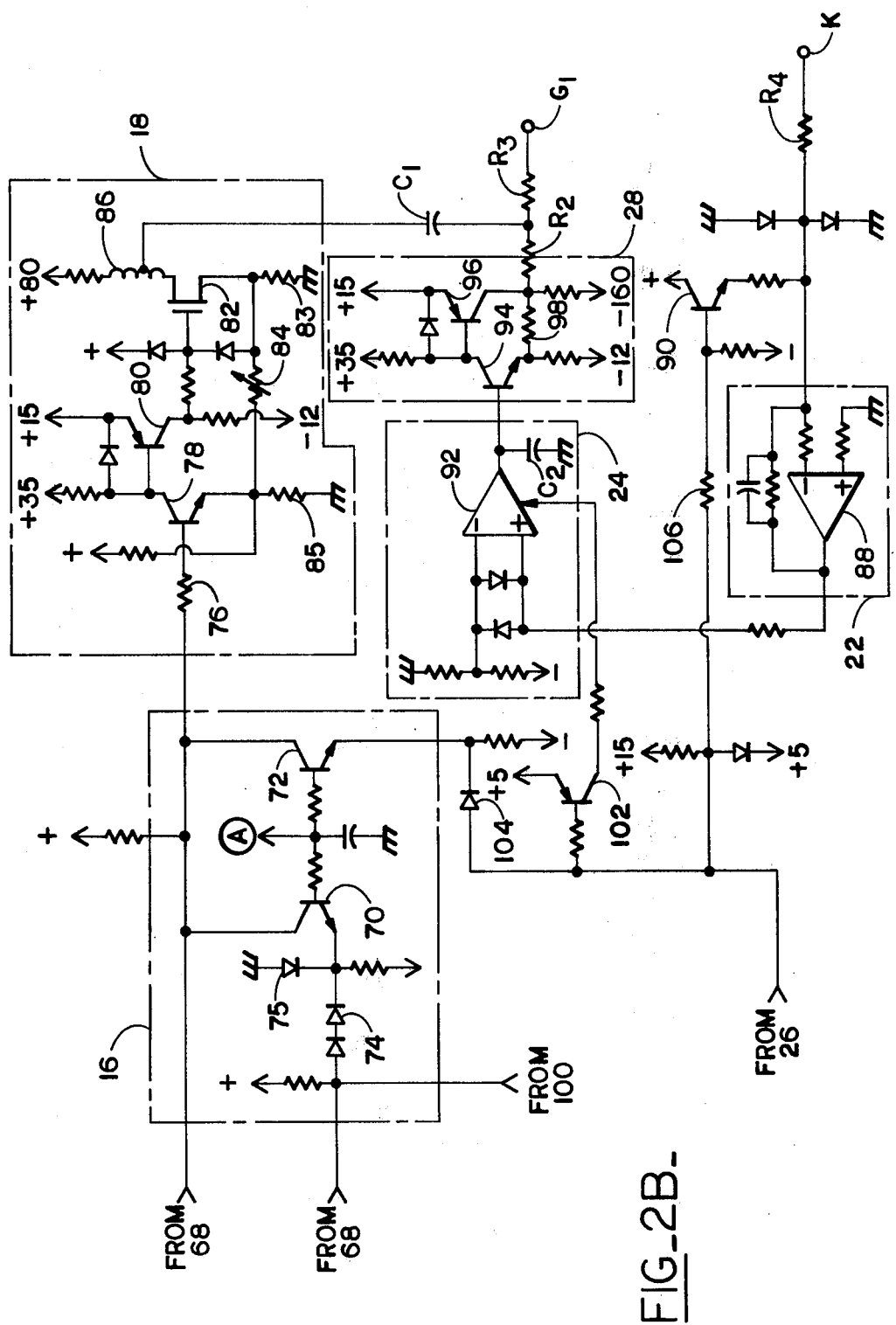
FIG_2B

CRT VIDEO DRIVE CIRCUIT WITH BEAM CURRENT STABILIZATION

BACKGROUND OF THE INVENTION

1. Field of the Invention

The present invention relates to a cathode-ray tube (CRT) video drive circuit, and more specifically, to an improved video amplifier circuit that combines high bandwidth with beam current stabilization.

2. Description of the Prior Art

Cathode-ray tubes (CRTs) have been used extensively in various electronic products, such as television receivers, oscilloscopes, and other display units because of their high brightness, quick response, and high resolution, among many other inherent advantages. In raster scan display devices, such as television receivers, the control grid ($G_1$) is driven by the output signal from a video amplifier. The output signal will control the cathode (K)-to-grid $G_1$ voltage thereby controlling the beam current over a certain range, the beam current modulating the phosphor luminescence while the electron beam is scanning across the phosphor screen.

The cutoff bias voltage of a CRT is affected by the heater temperature of the cathode, the cathode-to-grid $G_1$ spacing, cathode aging, and the second grid ($G_2$) voltage. Any change in the cutoff bias voltage will result in a different brightness of the displayed image on the CRT, and it will affect the low light color balance of the display if a color CRT is used.

Some circuits regulate the control grid-to-cathode voltage within close tolerances. However, warm-up and aging characteristics of the cathode still tend to modify the grid-to-cathode cutoff voltage, thereby affecting the beam current and, accordingly, the brightness of the displayed image.

In some prior art video amplifiers, the cathode current is monitored. A feedback loop connects the monitored cathode current to the input of an amplifier. The amplifier is connected to the control grid $G_1$ of the CRT. When the cathode current varies from a desired level, the input to the amplifier is changed in such a way as to modify the control grid voltage in order that the brightness of the displayed image, or the color balance of the display will be maintained at its desired level. However, with such a circuit configuration, the amplifier has a limited bandwidth because it is necessary to maintain the dynamic range of the output signal at a certain level.

SUMMARY OF THE INVENTION

It is therefore a primary object of the present invention to provide a wider bandwidth video amplifier that is capable of compensating for the thermal and aging effects of the CRT cathode.

It is another object of the present invention to utilize a pair of amplifiers connected in such a way that the drive circuit of the present invention exhibits a wider bandwidth than prior art circuits while maintaining the dynamic range of the output signal from the amplifier at a desired level.

It is still another object of the present invention to provide a CRT drive circuit capable of using less stable heater and $G_2$ supplies.

It is a further object of this invention to provide a CRT drive amplifier circuitry that provides both beam current stabilization and high-bandwidth capability.

These and other objects of the present invention are accomplished by utilizing a pair of amplifiers. A first amplifier, responsive to the video input signal, has its output terminal connected to the control grid of the CRT. A second amplifier, responsive to the cathode current of the CRT, has its output combined with the output of the first amplifier. The first amplifier has a wider bandwidth than corresponding prior art amplifiers, but has a lower dynamic range. In order to compensate for this lower dynamic range, the second above-mentioned amplifier is characterized by an output signal having a higher dynamic range than the output signal from the first amplifier. Since the output of the second amplifier is combined with the output from the first, the dynamic ranges of the two amplifiers are added together. Consequently, the bandwidth of the video amplifier is wider than the bandwidth of prior art video amplifiers, and the dynamic range of the output signal energizing the control grid of the CRT is maintained at its desired level.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 represents a block diagram illustrating the principles of operation of the video amplifier of the present invention; and FIG. 2 represents a simplified electrical circuit associated with the block diagram of FIG. 1.

DETAILED DESCRIPTION OF THE INVENTION

FIG. 1 of the drawings of the present application represents a block diagram illustrating one preferred embodiment of the present invention. A video input signal is applied to an input terminal 10. The input terminal 10 is connected to first amplifier 12. The gain and the DC level of the amplifier 12 is controlled by controls 11 and 13 connected thereto. The output terminal of the first amplifier 12 is connected to a blanking circuit 14. An output signal from the first amplifier 12 is supplied to the blanking circuit 14, and a blanking pulse is applied to the blanking circuit 14 in order to inhibit the normal video signal for reasons mentioned hereinafter. Connected to the output end of the blanking circuit 14 is a level insertion circuit 16 controlled by an output signal from pulse circuitry 26. A second amplifier 18 is connected to the output terminal of the level insertion circuit 16. This second amplifier 18 is a high bandwidth amplifier, referenced to ground, for amplifying the output signal from the level insertion circuit 16 and for providing the AC components of the signal from the first amplifier to the control grid $G_1$ of CRT 20, via coupling capacitor $C_1$ and resistor $R_3$. A current-to-voltage converting amplifier 22 is connected to the cathode of the CRT. The cathode current $I_k$ is sensed by the current to voltage amplifier 22. A sample and hold circuit 24 is connected to the output terminal of the current to voltage amplifier 22. The output signal from the amplifier 22 is sampled in the sample and hold amplifier 24. However, the sample and hold amplifier 24 is connected to the output terminal of the pulse circuitry 26 and is under the control thereof. The output terminal of the sample and hold circuit 24 is connected to a memory capacitor $C_2$ and to the input terminal of a fourth amplifier 28. The output signal from the sample and hold circuit 24 is stored in the memory capacitor $C_2$ as an analog value, which is amplified by the fourth amplifier 28. The fourth amplifier 28 generates an output signal having a wide dynamic range, wider than the dynamic range of the output signal from the second amplifier 18. The output signal from the amplifier 28 is combined with the output of the second amplifier 18, and provides DC signals to the grid $G_1$ of the CRT, via resistors $R_2$ and $R_3$. The bandwidth of the second amplifier $A_2$ (18) is greater than or equal to 20 Mhz. The dynamic range of amplifier $A_2$ (18) is approximately 50–120 volts. The dynamic range of the output signal from the fourth amplifier 28 is approximately 75–250 volts.

The present invention features, in construction, the use of fast amplifier 18, having a wider bandwidth than a similar amplifier of the prior art, and a wide dynamic range amplifier 28 for cooperatively driving the control grid $G_1$ of a CRT. Since the output terminal of amplifier 28 is connected to the output of the fast amplifier 18, the DC from the output of the amplifier 28 is added to the AC of the output signal from amplifier 18. In this way, the dynamic range of the output signal from amplifier 28 is, in effect, added to the dynamic range of the output signal from amplifier 18 thereby retaining the wide dynamic range of the video amplifier of the present invention. This particular circuit connection compensates for the low dynamic range of the output signal from amplifier 18. The low dynamic range of this amplifier 18 is a result of its wider bandwidth, wider than the bandwidth of a similar amplifier of the prior art. This construction realizes the intended beam current stabilization and makes the video amplifier very fast and stable. The operation of this video amplifier will be given hereunder in detail.

In operation, amplifier 22 is a current meter which measures the cathode current $I_k$ to provide an output voltage corresponding to $I_k$. Sample and hold (S/H) circuit 24 samples the output signal from amplifier 22 and stores an analog value in memory capacitor $C_2$ to represent $I_k$. Amplifier 28 is a DC source for the grid drive and determines the DC operating point for $G_1$. It should be noted that the circuit including $R_4$, amplifier 22, S/H 24, amplifier 28, $R_2$ and $R_3$ forms a closed loop which is poled to alter the K-to-$G_1$ bias voltage of CRT 20 to stabilize $I_k$ if it tends to change, thereby setting the $G_1$ bias voltage for an appropriate constant $I_k$ value at the sample time. Blanking circuit 14 which follows first amplifier 12 is activated to inhibit the normal video signal from amplifier 12 when a sample of $I_k$ is to be made by the cathode current sample pulse from pulse circuitry 26.

Pulse circuitry 26 may comprise four one-shots connected together in cascade fashion, which are triggered from horizontal and vertical retrace pulses. A PNP transistor, connected to the one shots, drives the sample and hold (S/H) amplifier 24. The level insertion circuit 16 is driven directly by the four oneshots.

Level insertion circuit 16 controlled by pulse circuitry 26 provides the grid drive level at the time that S/H circuit 24 samples $I_k$. Amplifier 18 is referenced to ground and uses a supply voltage appropriate to the dynamic range of the video signal needed by the CRT control grid $G_1$.

Amplifier 12 can be made to have high bandwidth and limited dynamic range. However, amplifier 18 in a conventional video amplifier design must have sufficient dynamic range to meet the cutoff voltage range of $G_1$.

It is again noted that, since amplifier 18 has a wider bandwidth than the similar amplifier of the prior art, it therefore provides an output signal having a lower dynamic range. Amplifier 28 generates an output signal having a wider dynamic range than the output signal generated from amplifier 18. Since the dynamic range of the output signal from amplifier 18 is lower than the similar amplifier of the prior art, it is necessary that the output terminal of amplifier 28 be combined with the output of amplifier 18. In this way, the DC from amplifier 28 is added to the AC from amplifier 18 to alter the grid to cathode voltage ($G_1$) in order to keep the current $I_k$ from the cathode at the desired level, inspite of the warm-up and aging characteristics of the cathode. Therefore, the wider dynamic range of the output signal from amplifier 28, relative to amplifier 18, adds to the lower dynamic range of the output signal from amplifier 18 (relative to similar amplifiers of the prior art), thereby maintaining the desired dynamic range of the signal energizing the grid $G_1$ of the CRT 20. Since amplifier 18 has a wider bandwidth than the similar amplifiers of the prior art, the video amplifier of the present invention is characterized by a wider bandwidth than the prior art amplifiers while retaining the dynamic range of the signal energizing the grid $G_1$.

FIG. 2 is a detailed circuit of the components which comprise the individual circuit elements shown in FIG. 1. For example, in FIG. 2, note the DC level control circuit 13, the blanking circuit 14, the gain control circuit 11, the level injection circuit 16, the second amplifier 18, the sample and hold circuit 24, the third amplifier circuit 22, and the fourth amplifier circuit 28. First amplifier 12 comprises a common base NPN transistor 30 whose emitter is coupled to the input terminal 10 through resistor 32, and whose base is connected to a base bias circuit including temperature compensation diode 34. DC control 13, which may be potentiometer 36, is also connected to the emitter of transistor 30. The collector of transistor 30 is connected, via switching diode 38, to the emitter of common base PNP transistor 40, which constitutes one part of gain control 11 of first amplifier 12. The other part of gain control 11 is FET 42 connected to the collector of transistor 40, and a controllable voltage source including transistor 44 and potentiometer 46. Blanking circuit 14 consists of emitter coupled PNP transistor pair 48 and 50, with the base of transistor 48 receiving a constant voltage derived from a resistive divider, switching diodes 52 and 54 connected to the collectors of transistors 48 and 50 and several associated passive components. Another diode 56 and transistor 58 are connected to the emitter of transistor 40. The base potential of transistor 50 is controlled by the horizontal retrace pulse applied thereto via terminal H.

The collector output of transistor 40 is then coupled to amplifier Q60 and Q62 and blanking circuit Q66 and Q68 then to level insertion circuit 16 including common base transistors 70–72 and diodes 74, 75. The collector output currents of transistors 68, 70 and 72 are transmitted to second amplifier 18 including input resistor 76, bipolar transistors 78, 80, MOS FET 82 and controllable feedback resistor 84. The output from amplifier 18 is coupled to $G_1$ of CRT 20 via capacitor $C_1$ and resistor $R_3$.

Cathode current $I_k$ is sensed through resistor $R_4$ by current meter amplifier 22 including operational amplifier 88. The output signal representing the sensed current $I_k$ is then supplied to S/H circuit 24 including gated operational amplifier 92 and memory capacitor $C_2$ connected at the output of amplifier 92. The sampled output signal across memory capacitor $C_2$ is supplied to fourth amplifier 28 including NPN and PNP transistors 94 and 96 before being supplied to $G_1$ through resistor $R_2$ and protection resistor $R_3$.

Pulse circuitry 26 receives the horizontal and vertical retrace pulses through terminals H and V, respectively. The horizontal retrace pulse is also applied to switching transistor 100 to drive current switch transistors 66–68. The output signal from pulse circuitry 26 is applied to the base of transistor 100 via resistor 106, to the emitter of transistor 72 via diode 104, and also to S/H circuit 24 via PNP transistor 102.

The video amplifier in FIG. 2 operates as follows: During the active line time excluding the horizontal blanking period, the input video signal applied to input terminal 10 is amplified by transistor 30. The resulting signal current, in addition to the controllable DC current from DC level control 13 from potentiometer 36, flows through the collector of transistor 30, diode 38 and variable resistor 41. Transistor 50 is conducting and transistor 48 non-conducting in this condition. Thus, diodes 54 and 52 are conducting and non-conducting, respectively. Transistor 58 is also conducting. Since a constant current predetermined by the resistance of resistor 41 flows therethrough, the emitter-collector current of transistor 40 is a linear function of the input video signal. It should be noted that the use of common base transistor 30 ensures the wideband signal amplification. The controllable voltage from transistor 44 develops a controllable gate potential for FET 42 which acts as a variable resistor. The signal amplitude or the gain of amplifier 12 at the collector of transistor 40 depends on the resistance of FET 42 or the output current from current source transistor 44, thereby providing the desired gain control without decreasing the frequency or the bandwidth.

During the horizontal blanking period, the positive horizontal retrace pulse on terminal H turns transistor 50 off and transistor 48 on, thereby turning on diode 52 and turning off diodes 38 and 54. Also transistor Q100 is turned on turning Q68 and Q70 off and on, respectively. This effectively prevents the video signal from reaching the subsequent stages. The output current is determined solely by the collector current of transistor 70, or by the resistor 71 and the voltage source connected to the lower end of resistor 71. Diode 34 is used for temperature compensation purposes to minimize thermal drift.

The output signal from transistor 40 is amplified by transistor 60, whose collector output is selectively coupled to second amplifier 18. During the line scanning (active) time, transistor 100 is off, thereby ensuring transistor 68 conductive. However, transistor 68 is rendered non-conducting during the retrace period. Although not shown in FIG. 2, the collector output from transistor 66 may be used to adjust the DC level and gain of amplifier 12 for establishing the operating condition of such amplifier 12. Transistor 70 is biased to remain non-conductive during the horizontal scanning period but becomes conductive during the horizontal blanking period. In other words, either one of transistors 68 and 70 conducts depending upon the horizontal retrace pulse. The transistor 72 is conductive only during beam current sample time to provide DC current to second amplifier 18. At beam current sample time, Q68 and Q70 off and on.

Second amplifier 18 receives the collector currents from transistors 68, 70 and 72 through input resistor 76. The amplifier also includes feedback resistor 84 to determine the gain of such amplifier, and operates as a conventional negative feedback amplifier well known for a person skilled in the art.

Third or current meter amplifier 22 is a conventional operational amplifier to develop an output voltage representing the cathode current $I_k$ of CRT 20. The sampling pulse from pulse circuitry 26 is normally high, thereby clamping the input to amplifier 88 by turning on transistor 90. Diode 104 is also conductive to maintain transistor 72 non-conducting except when pulse circuitry 26 generates a sample pulse. Transistor 102 is non-conducting to hold the previous sample in memory capacitor $C_2$. When pulse cicuitry 26 generates a sample pulse, sampling amplifier 92 is now activated by switching transistor 102 to sample the output from current meter amplifier 88 which is now active or released from the clamped condition. Sampling pulses may be generated in synchronism with the vertical retrace pulse so that the sampled cathode current is unaffected by the video signal itself. It should be noted that fourth amplifier 28 is supplied from high positive and negative voltages to provide the required wide dynamic range. This wide dynamic range combines with the lower dynamic range of amplifier 18 to provide the required dynamic range of the signal energizing the grid $G_1$.

As is understood from the foregoing description, the video amplifier according to this invention is very effective when used for driving a CRT because $I_k$ can automatically be maintained at a predetermined level. Because of the fourth amplifier 28, having a wider dynamic range than that of amplifier 18, since the amplifier 28 combined with the output of amplifier 18, the control grid ($G_1$) can be driven by using a wideband and limited dynamic range amplifier 18.

First amplifier 12 can maintain the bandwidth even if the gain is varied over the wide range. A remote control of the gain can be made because the gain is responsive to the DC current. In addition, power supplies for the heater, $G_2$ and heater electrodes are not very critical to the circuit operation.

Although this invention as described illustrates a preferred embodiment only, it is easily understood by a person skilled in the art that various modifications can be made to be best suited to his particular application without departing from the scope of this invention. For example, operational amplifier 92 can be replaced by an electronic switch. The video amplifier can be implemented to respond to a certain reference pulse included in the input video signal.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim as my invention:

1. A video amplifier for driving a cathode-ray tube in response to a video signal, said tube including a control grid and a cathode, comprising:

first amplifier means having an output terminal connected to said control grid and responsive to said video signal for amplifying said video signal thereby generating a control signal for driving said control grid;

converter means connected to said cathode of said cathode-ray tube for sensing the current from said cathode and for converting the sensed current into a voltage representative thereof in response thereto; and second amplifier means connected to the converter means for amplifying said voltage thereby generating an amplified voltage signal, said second amplifier means having an output terminal connected to the output terminal of said first amplifier means, the bandwidth of said first amplifier means being wider than the bandwidth of said second amplifier means, the dynamic range of said amplified voltage signal from said second amplifier means being larger than the dynamic range of said control signal from said first amplifier means.

2. A video amplifier in accordance with claim 1 wherein the bandwidth of said first amplifier means is greater than or equal to 20 MHz.

3. A video amplifier in accordance with claim 2 wherein the dynamic range of said amplified voltage signal from said second amplifier means is approximately 75 to 250 volts.

* * * * *